(12) United States Patent
Hughes

(10) Patent No.: US 8,949,737 B2
(45) Date of Patent: Feb. 3, 2015

(54) CENTRALIZED APPLICATION PACKAGE DISTRIBUTION

(75) Inventor: Richard Hughes, London (GB)

(73) Assignee: Red Hat, Inc., Raleigh, NC (US)

( * ) Notice: Subject to any disclaimer, the term of this patent is extended or adjusted under 35 U.S.C. 154(b) by 988 days.

(21) Appl. No.: 12/607,757

(22) Filed: Oct. 28, 2009

(65) Prior Publication Data

US 2011/0099516 A1     Apr. 28, 2011

(51) Int. Cl.
*G06F 9/445*     (2006.01)

(52) U.S. Cl.
CPC ........................................ *G06F 8/61* (2013.01)
USPC ........... 715/810; 715/748; 715/749; 715/808; 715/809

(58) Field of Classification Search
None
See application file for complete search history.

(56) References Cited

U.S. PATENT DOCUMENTS

| | | | | |
|---|---|---|---|---|
| 5,666,501 | A * | 9/1997 | Jones et al. | 715/748 |
| 7,707,514 | B2 * | 4/2010 | Forstall et al. | 715/810 |
| 7,761,811 | B1 * | 7/2010 | Chaudhri | 715/835 |
| 2002/0002468 | A1 * | 1/2002 | Spagna et al. | 705/1 |
| 2003/0084096 | A1 * | 5/2003 | Starbuck et al. | 709/203 |
| 2006/0174319 | A1 * | 8/2006 | Kraemer et al. | 726/1 |
| 2007/0083522 | A1 * | 4/2007 | Nord et al. | 707/10 |
| 2007/0234343 | A1 * | 10/2007 | Gouge et al. | 717/174 |

OTHER PUBLICATIONS

"Fedora 11 Installation Guide: Installing Fedora 11 on x86, AMD64, and Intel® 64 architectures," Ed. 1.0, Fedora Documentation Project, fedora-docs-list@redhat.com, Red Hat, Inc. and others, 2009, 274 pages.
"Fedora 11 User Guide: Using Fedora 11 for common desktop computing tasks," Ed. 1.0, Fedora Documentation Project, fedora-docs-list@redhat.com, Red Hat, Inc. and others, 2009, 118 pages.
"File Association Web Service and Internet Communication," Microsoft Corporation, Microsoft TechNet, 2009, downloaded from http://technet.microsoft.com/en-us/library/cc784930(WS.10,printer).aspx, 7 pages.
"Skip the Annoying 'Use the Web service to find the correct program' Dialog," HowToGeek.com, Mar. 30, 2008, downloaded from http://www.howtogeek.com/howto/windows-vista/skip-the-annoying-use-the-web-service-to-find-the-correct-program-dialog/, 3 pages.

* cited by examiner

*Primary Examiner* — Anil N Kumar
(74) *Attorney, Agent, or Firm* — Lowenstein Sandler LLP

(57) ABSTRACT

A package installer identifies a utility tool that is capable of opening a file attempted by a user based on metadata downloaded from a remote server, where the metadata includes information identifying one or more packages available for download from the remote server, including mime types of files that the one or more packages support. A graphical user interface (GUI) is displayed to the user prompting whether the user desires to install the identified utility tool. In response to an input from the user via the GUI, the package installer downloads a package associated with the identified utility tool from the remote server for local installation.

16 Claims, 6 Drawing Sheets

Header:
| requires: openoffice > 2.0.0   203
| provides: mime-handler("plain/text")   204
| installed size: 200kb

201

Body:
| /etc/foo.conf
| /usr/bin/foo-application
| /usr/share/foo/icon.png

CENTRALIZED APPLICATION PACKAGE DISTRIBUTION

TECHNICAL FIELD

Embodiments of the invention relate generally to the field of software application distribution; and more particularly, to centralized application package distribution.

BACKGROUND

People often send other users documents and images. These files are often of different formats, as a user could send a Microsoft Word file (.doc file) or a GNU image manipulation program (GIMP) image (.xcf) via email, instant messaging or even on physical media.

There is a problem in a desktop such as Linux desktop, where people send files that are not recognized by a remote user. This might happen if a user sent a remote user a ".xcf" formatted image, when GIMP was not installed at the remote user's machine. In this case the remote user would get the "file not recognized" dialog, and would be left to search for a program manually to open this file. This requires for the remote user to know which program to use to open the file.

Conventional methods typically will prompt a user whether the user wants to search, for example, over the Internet, for such a program to open the file. However, the program to open the file may be distributed in multiple sites having multiple versions. The user has to know which version is the most appropriate for opening the file.

BRIEF DESCRIPTION OF THE DRAWINGS

The present invention is illustrated by way of example and not limitation in the figures of the accompanying drawings in which like references indicate similar elements.

FIG. 2 is a block diagram illustrating a package file according to one embodiment of the invention.

DETAILED DESCRIPTION

Figure 1:
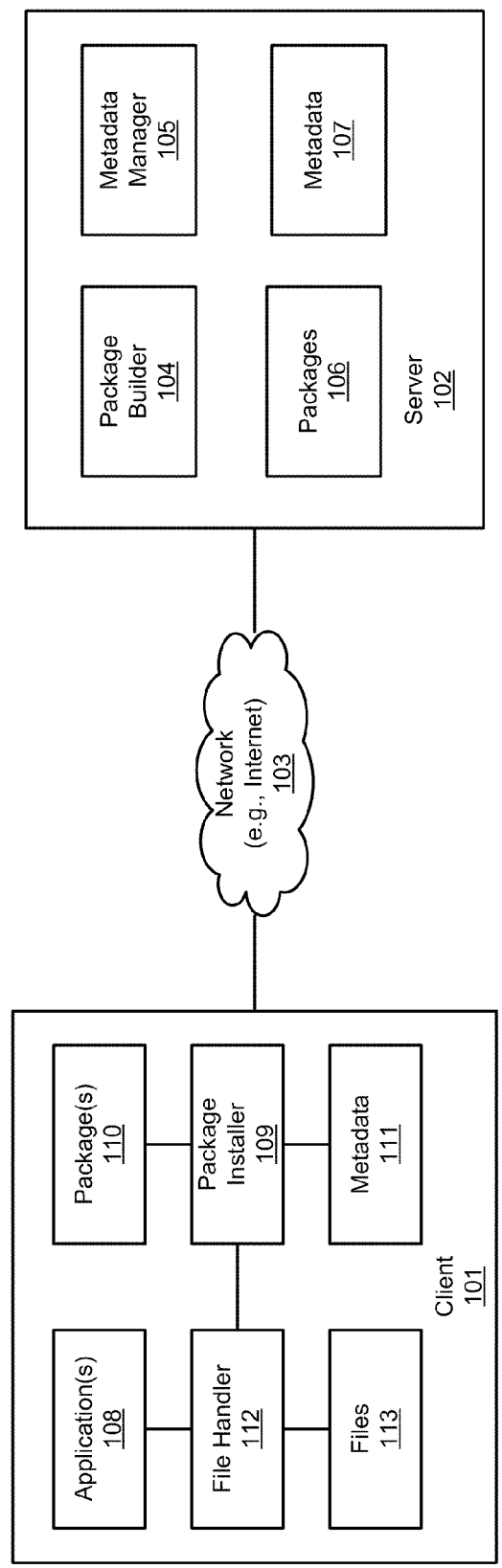
FIG. 1 is a block diagram illustrating a network configuration according to one embodiment of the invention.

In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

When a package is built, each application has a desktop file created as a standard part of the build process. According to one embodiment, by parsing a file for mime-type matches, each mime type is added as a virtual provide to the built package. This virtual provide is added to the distribution metadata which allows remote programs to query what package supports a given mime type. In Linux this is done using a WhatProvides( ) method, typically via a package manager such as PackageKit available from Red Hat, Inc. of Raleigh, N.C. An example query would be WhatProvides ("MimeHandler(application/pdf)") which would return a list of all the not-installed packages that would be able to open this file format. By providing a tool to extract the mime data at package build time, many of virtual provides can be automatically added just by rebuilding all the packages in a repository on a storage device.

A mime type is a computer readable file type. For example, a ".pdf" file is the mime type of portable document format (PDF) files. A mime type can be extracted from a file even if the file extension is incorrect (.doc is mistyped as .dpc for example) and usually a higher level of file system logic is used to do this content sniffing. In the Linux desktop GNU virtual file system (GVFS) provides a mime-type as an attribute on a GFile instance.

A desktop file is a file that is installed on the computer that describes the application (localized name) and also tells the computer what mime-types it supports. A virtual provide is a little piece of data about the package that resides in the distribution metadata, and thus the package does not have to be installed to query this data.

By integrating this functionality into a file handler (in the case of GNOME, nautilus) or as a separate tool accessible to the file handler, when a user downloads a file of unknown format, the file handler tries to open the file and provides a list of applications the user can install which is capable of opening the newly downloaded file. After the packages are installed, the file handler uses the installed application to open the downloaded file. In this way a user can send files to remote users knowing that they will be able to open the contents.

FIG. 1 is a block diagram illustrating a network configuration according to one embodiment of the invention. Referring to FIG. 1, network configuration 100 includes a client 101 communicatively coupled to a server 102 over a network. Client 101 can be any kind of computing devices such as desktop, laptop, personal digital assistant (PDA), or cellular phone, etc. Server 102 may include one or more computing devices such as a Web server for distributing software packages that can be downloaded by client 101 over network 103. Network 103 may be local area network (LAN) or a wide area network (WAN) such as the Internet. Note that although one client and one server are shown in FIG. 1, multiple clients and/or servers may also be implemented.

In one embodiment, server 102 includes, among others, a package builder 104 and metadata manager 105. Package builder 104 is configured to build (e.g., compile and/or link) and manage packages 106 that can be downloaded by client 101 for installation at client 101. A package is a single file that is a compressed tree of the files (e.g., binary files), which are compiled from a variety of source codes of a variety of programming languages. Once a package is built, according to one embodiment, the metadata manager 105 is configured to scan each file contained in the package and add certain metadata to the package. The added metadata includes information indicating a particular application program that should be used to open the associated file, such as, for example, "package foo needs package OpenOffice™ to work correctly" or "package foo can open text files", etc.

The added metadata is typically added to a header of the package, such as, for example, the package file 200 as shown in FIG. 2. Referring to FIG. 2, package file 200 includes a file header 201 and body 202. File header 201 includes metadata 203 indicating that the file having the file header 201 requires the OpenOffice™ with at least version 2.0.0 in order to open the file. The file header 201 also includes metadata 204 indicating the mime type associated with the file. File body 202 includes all the individual files contained in the package 200. As a result, when a file hander attempts to open the corresponding file, the file handler can determine the mime type of the package and knows which application program is required to open the package.

Referring back to FIG. 1, the package 200 can then be stored in a storage device associated with server 102 as a part of packages 106. In addition, metadata manager 105 is configured to scan each of the packages 106 and to extract all the metadata from the packages 106 (e.g., "requires: openoffice>2.0.0") and all that data is saved to a metadata as a part of metadata 107 in a storage device. A metadata may be an extensible markup language (XML) compatible data file. This metadata file is relatively small compared to the size of the packages as it does not contain all the file content data; it just contains all the text metadata. The metadata file is compressed and the file is saved in a storage device as a part of metadata 107.

Client 101 includes one or more applications 108 communicatively coupled to a file handler 112, which provides an application programming interface (API) to access one or more files 113. When application 108 attempts to open a file via file handler 112, if file handler 112 cannot recognize the file that is being opened, the file handler 112 invokes a package installer 109 to download one or more packages 110 and/or the associated metadata 111 from server 102 over network 103. The packages 110 include an application program or utility tool that is capable of opening the file.

According to one embodiment, when application 108 attempts to open a file that is not recognizable, package installer 109 is invoked, for example, to "find me all packages that provide mime-handler ('plain/text')". The package installer 109 can download the newest metadata file 107 very quickly from server 102 because the metadata is relatively small in size. The package installer 109 then knows about every package (e.g., packages 106) available for installation from server 102. Package installer 109 can scan the metadata looking for matches, and return a list to the user of the packages that match the search (e.g., available for installation for opening the unrecognized file).

Figure 3A:
FIGS. 3A and 3B are screenshots illustrating example of graphical user interfaces (GUIs) which may be used with one embodiment of the invention.

For example, when a user attempts to open a media file, the package installer determines that an additional media player codec or plug-in is needed based on the metadata associated with the media file. The package installer (in this example, a codec installer) displays, as shown in FIG. 3A, a graphical user interface (GUI) to the user, wherein GUI 310 includes information identifying a particularly application program, in this example, a Windows™ Media Video 9 decoder is needed. According to one embodiment, at least a portion of the information displayed may be extracted from the metadata.

Figure 3B:
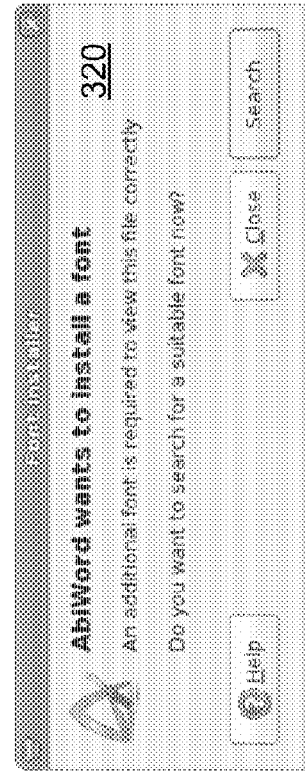

Similarly, when a user attempts to open a document with an unknown font, the font installer (as a part of package installer) displays a GUI 320 of FIG. 3B indicating that an additional font needs to be installed.

In response to the GUI displayed, referring back to FIG. 1, if the user actually wants to install identified application program or font, the package installer has to match the name of the application program or font to a remote filename using the previously downloaded metadata (e.g., metadata 111), and then download the package itself (e.g., packages 106). The user can then install the local file at client 101. In this way, the package installer can automatically locate the latest or a specific version of required application program or font files from server 102 and install them at client 101. As a result, a user of client 101 does not need to know which application program is needed for opening a particular file and does not need to conduct a search over the network.

The metadata 111 stored at the local system can be periodically updated by downloading the newest metadata 107 from server 102 onto the local client 101, and then search through it to find if any of the remote packages are newer than the ones that have been installed locally. In this way the metadata 111 is kept up to date. Since the packages and metadata are distributed by a centralized server or servers 102, the client 101 can be sure that the packages downloaded and installed are the latest versions.

Figure 4:
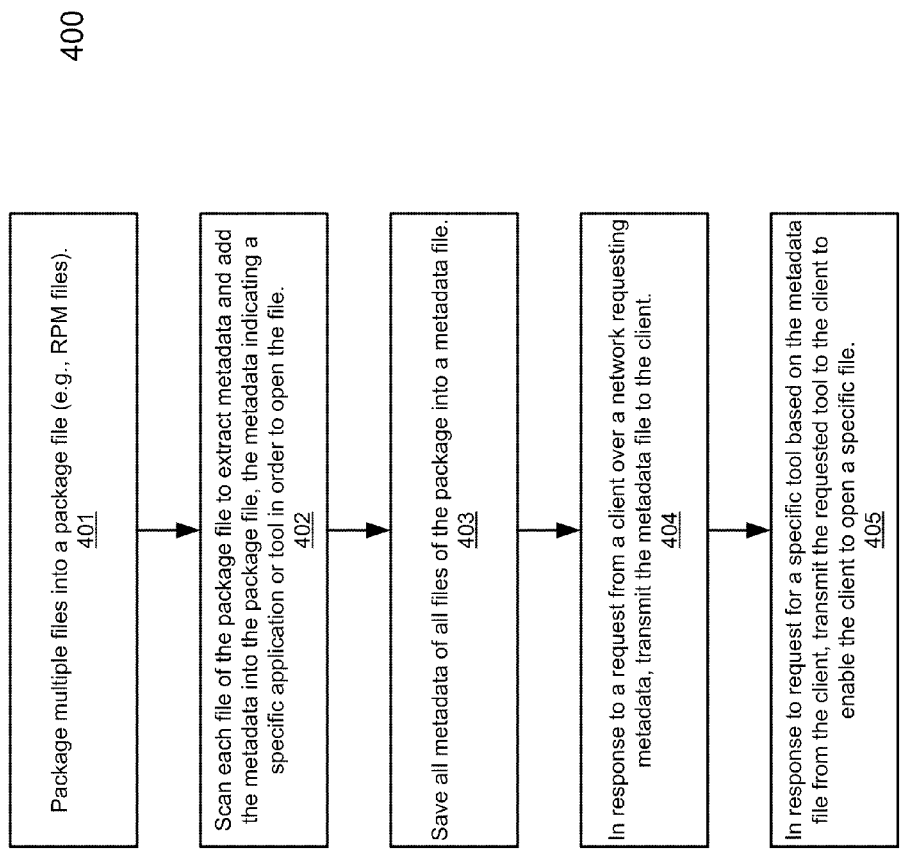
FIG. 4 is a flow diagram illustrating a method for building packages and metadata for download and installation according to one embodiment.

FIG. 4 is a flow diagram illustrating a method for building packages and metadata for download and installation according to one embodiment. Note that method 400 may be performed by processing logic which may include software, firmware, hardware, or a combination thereof. For example, method 400 may be performed by package builder 104 and/or metadata manager 105 of FIG. 1. Referring to FIG. 4, at block 401, multiple files (e.g., binary files) are package into a package file, such as, for example, a Red Hat package manager (ROM) file distributed by Red Hat, Inc. of Raleigh, N.C. At block 402, each file in the package is scanned and certain metadata is extracted and added into the package, where the metadata indicates a specific application program or tool required to open the respective file or alternatively, types of files that the respective file can handle. At block 403, all metadata is extracted from the package and stored in a metadata file. Subsequently, in response to a request from a client over a network requesting metadata, at block 404, the metadata is transmitted to the client. In response to receiving a further request for installing a specific tool based on the metadata file from the client, at block 405, a package associated with the requested tool is transmitted to the client for opening a specific file that was not recognized by the client.

Figure 5:
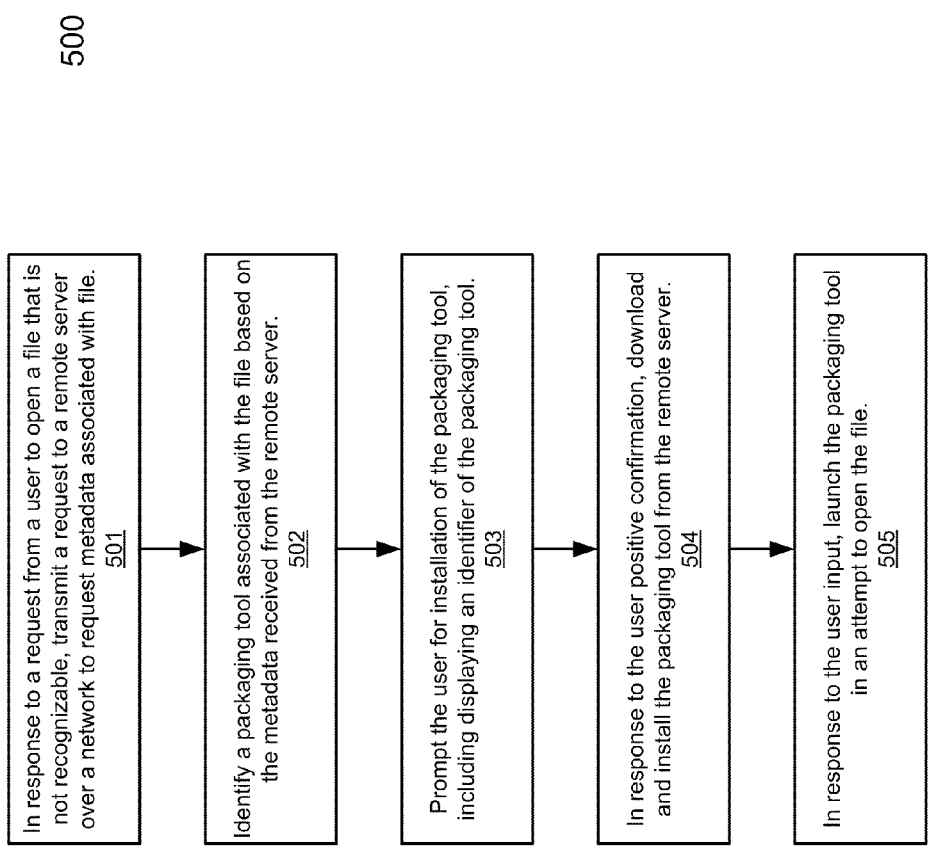
FIG. 5 is a flow diagram illustrating a method for installing packages according to one embodiment.

FIG. 5 is a flow diagram illustrating a method for installing packages according to one embodiment. Note that method 500 may be performed by processing logic which may include software, firmware, hardware, or a combination thereof. For example, method 500 may be performed by package installer 109 of FIG. 1. Referring to FIG. 5, in response to a request from a user to open an unrecognized file, at block 501, a request is transmitted to a remote server over a network requesting metadata associated with the file being open. Note that if there is an existing metadata stored locally, the local metadata may be examined first before sending a request for an updated metadata. As described above, the metadata may be periodically updated from the remote server. At block 502, a packaging tool is identified that is capable of opening the file based on the metadata received from the remote server or alternatively, based on a local copy of the metadata. The packaging tool may be identified by matching metadata extracted from the unrecognized file and the metadata stored in the metadata file. At block 503, a GUI is displayed to the user requesting whether the user desires to download and install the required packaging tool. In response to an input received from the user via the GUI, at block 504, the identified packaging tool is downloaded from the server and installed at the client locally. At block 505, the packaging tool is launched in response to a user input.

Figure 6:
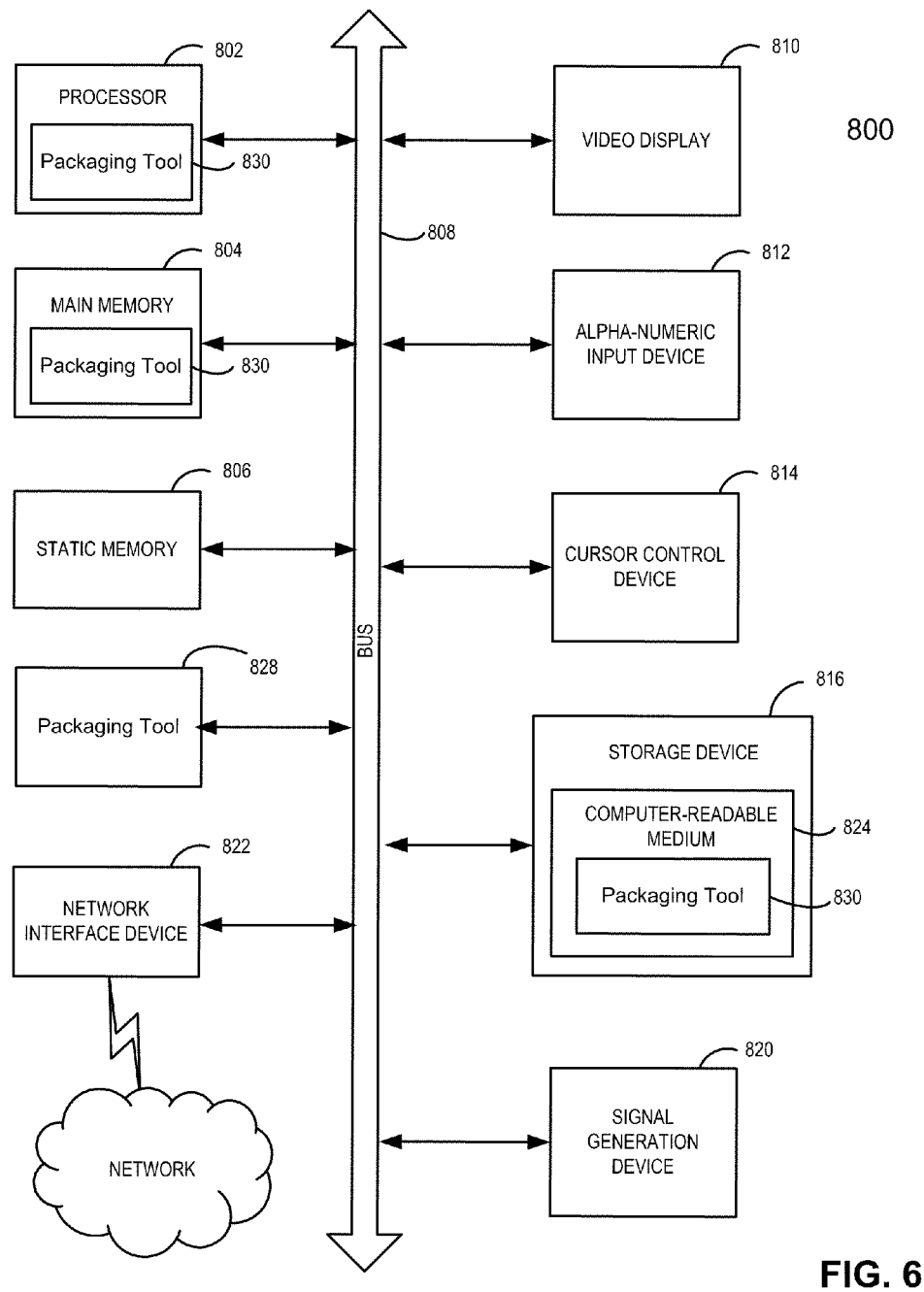
FIG. 6 illustrates a diagrammatic representation of a machine in the exemplary form of a computer system according to one embodiment.

FIG. 6 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 816, which communicate with each other via a bus 808.

Processor 802 represents one or more general-purpose processors such as a microprocessor, a central processing unit, or the like. More particularly, the processor may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 802 may also be one or more special-purpose processors such as an application specific integrated circuit (ASIC), a field programmable gate array (FPGA), a digital signal processor (DSP), network processor, or the like. The processor 802 is configured to execute the instructions 830 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-accessible storage medium 824 (also known as a machine-readable storage medium or a computer-readable medium) on which is stored one or more sets of instructions or software (e.g., packaging tool 830, which may be implemented as part of package installer 109, package builder 104, and/or metadata manager 105) embodying any one or more of the methodologies or functions described herein. The packaging tool 830 may also reside, completely or at least partially, within the main memory 804 and/or within the processor 802 during execution thereof by the computer system 800, the main memory 804 and the processor 802 also constituting machine-accessible storage media. The packaging tool 830 may further be transmitted or received over a network via the network interface device 822.

The computer-readable storage medium 824 may also be used to store the packaging tool 830 persistently. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 828, components and other features described herein can be implemented as discrete hardware components or integrated in the functionality of hardware components such as ASICS, FPGAs, DSPs or similar devices. In addition, the modules 828 can be implemented as firmware or functional circuitry within hardware devices. Further, the modules 828 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "displaying" or "downloading" or "receiving" or "invoking" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method comprising:
   receiving, by a processor, a request to open a file;
   determining that a type of the file is unrecognizable;
   in response to the determination that the type of the file is unrecognizable, sending a request to a remote server over a network for metadata, the metadata indicating an application program to open the file;
   downloading, from the remote server, the metadata;
   identifying, by a package installer executable by the processor, the application program to open the file in view of the metadata downloaded from the remote server;
   displaying a graphical user interface (GUI) to a user prompting whether the user desires to install the identified application program;
   in response to an input from the user via the GUI, downloading, by the package installer, a package comprising the identified application program from the remote server for local installation;
   scanning metadata associated with the package;
   determining a match between the metadata associated with the package and the metadata downloaded from the remote server;
   displaying an indication of the match between the metadata associated with the package and the metadata downloaded from the remote server;
   receiving, at a file handler, the request for opening the file from the application program operated by the user;
   attempting, by the file handler, to open the requested file;
   invoking the package installer to identify the application program if the file handler fails to open the requested file;
   installing locally, by the package installer, the application program downloaded from the remote server; and
   displaying a list of programs including the installed application program to enable the user to select the application program to open the file.

2. The method of claim 1, wherein prior to downloading the identified application program, a package for distributing the application program is created within the remote server, wherein metadata is extracted from the application program and added into the package, the metadata extracted from the application program includes information identifying the type of the file that the application program is capable of handling.

3. The method of claim 2, wherein a body of the package includes a file associated with the application program.

4. The method of claim 3, wherein a copy of the metadata associated with the application program is stored in a metadata file that also contains metadata of other packages available for download from the remote server.

5. The method of claim 1, further comprising periodically downloading the metadata from the remote server to retrieve a most recent metadata available from the remote server.

6. A non-transitory computer readable medium including instructions that, when executed by a processor, cause the processor to execute operations comprising:
   receiving, by a processor, a request to open a file;
   determining that a type of the file is unrecognizable;
   in response to the determination that the type of the file is unrecognizable, sending a request to a remote server over a network for metadata, the metadata indicating an application program to open the file;
   downloading, from the remote server, the metadata;
   identifying, by a package installer executable by the processor, the application program to open the file in view of the metadata downloaded from the remote server;
   displaying a graphical user interface (GUI) to a user prompting whether the user desires to install the identified application program; and
   in response to an input from the user via the GUI, downloading, by the package installer, a package comprising the identified application program from the remote server for local installation,
   scanning metadata associated with the package;
   determining a match between the metadata associated with the package and the metadata downloaded from the remote server;
   displaying an indication of the match between the metadata associated with the package and the metadata downloaded from the remote server;
   receiving, at a file handler, the request for opening the file from the application program operated by the user;
   attempting, by the file handler, to open the requested file;
   invoking the package installer to identify the application program if the file handler fails to open the requested file;
   installing locally, by the package installer, the application program downloaded from the remote server; and
   displaying a list of programs including the installed application program to enable the user to select the application program to open the file.

7. The non-transitory computer readable medium of claim 6, wherein prior to downloading the identified application program, a package for distributing the application program is created within the remote server, wherein metadata is extracted from the application program and added into the package, the metadata extracted from the application program includes information identifying the type of the file that the application program is capable of handling.

8. The non-transitory computer readable medium of claim 7, wherein a body of the package includes a file associated with the application program.

9. The non-transitory computer readable medium of claim 8, wherein a copy of the metadata associated with the application program is stored in a metadata file that also contains metadata of other packages available for download from the remote server.

10. The non-transitory computer readable medium of claim 6, wherein the operations further comprise periodically downloading the metadata from the remote server to retrieve a most recent metadata available from the remote server.

11. A system, comprising:
a memory;
a processing device communicably coupled to the memory; and
a file handler to:
receive a request to open a file,
determine that a type of the file is unrecognizable,
in response to the determination that the type of the file is unrecognizable, send a request to a remote server over a network for metadata, the metadata indicating an application program to open the file,
download, from the remote server, the metadata;
a package installer coupled to the file handler to identify the application program to open the file in view of metadata downloaded from the remote server; and
a display device coupled to file handler and package installer to display a graphical user interface (GUI) to a user prompting whether the user desires to install the identified application program, wherein in response to an input from the user via the GUI, the package installer to download a package comprising the identified application program from the remote server for local installation, scan metadata associated with the package;
determine a match between the metadata associated with the package and the metadata downloaded from the remote server;
display an indication of the match between the metadata associated with the package and the metadata downloaded from the remote server;
receive the request for opening the file from the application program operated by the user;
attempt to open the requested file;
invoke the package installer to identify the application program if the file handler fails to open the requested file;
install locally the application program downloaded from the remote server; and
display a list of programs including the installed application program to enable the user to select the application program to open the file.

12. The system of claim 11, wherein the package installer to install the application program downloaded from the remote server, and wherein the display device to display a list of programs including the installed application program to enable the user to select the application program to open the file.

13. The system of claim 11, wherein the package installer periodically downloads the metadata from the remote server to retrieve a most recent metadata available from the remote server.

14. A method comprising:
receiving, by a processor, a request to open a file;
determining that a type of the file is unrecognizable;
in response to the determination that the type of the file is unrecognizable, sending a request to a remote server over a network for metadata, the metadata indicating an application program to open the file;
scanning, by a package builder executable by the processor, each of the files contained in a package file comprising a plurality of files packaged therein to extract metadata associated with each file;
determining a match between the metadata associated with each file and the metadata indicating the application program to open the file;
displaying an indication of the match between the metadata associated with each file and the metadata indicating the application program to open the file;
inserting, by a package builder, the extracted metadata into a header of the package file, the metadata further comprising an indication of a mime that a file contained within the package file is capable of handling;
storing, by a metadata manager, the extracted metadata into a metadata file, wherein the metadata file comprises metadata associated with other package files available for download;
transmitting, by the metadata manager, the metadata file to a client over a network in response to a request for metadata from the client;
transmitting, by the package builder, a particular package file to the client in response to a request for the particular package file from the client in view of the metadata, wherein the package file is to be installed at the client in response to a failure to open a particular file, and wherein the transmitted package file to open the particular file;
receiving, at a file handler, the request for opening the file from the application program operated by the user;
attempting, by the file handler, to open the requested file;
invoking the package builder to identify the application program if the file handler fails to open the requested file;
installing locally, by the package builder, the application program downloaded from the remote server; and
displaying a list of programs including the installed application program to enable the user to select the application program to open the file.

15. The method of claim 14, wherein a body of the package includes a file associated with the application program.

16. The method of claim 14, wherein the metadata file is periodically updated in view of the package files available for download.

* * * * *